Figure 1:
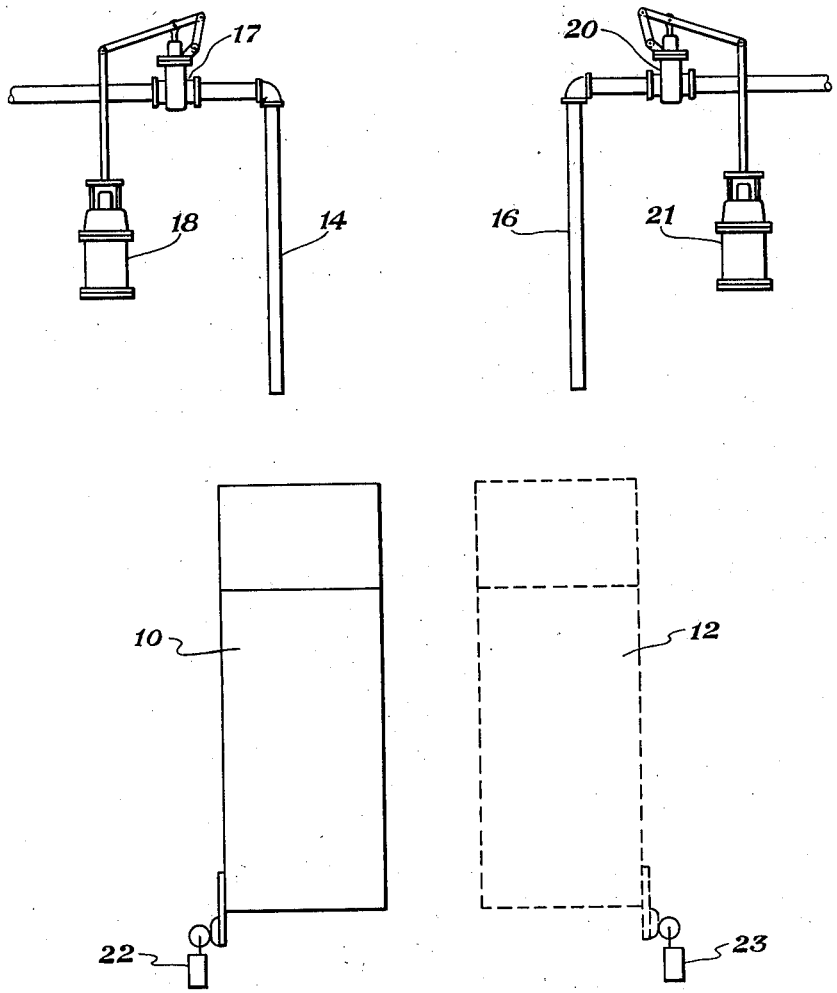

Jan. 15, 1935. A. J. WHITCOMB ET AL 1,988,100
AUTOMATIC WATER CONTROL
Filed May 16, 1932 2 Sheets-Sheet 1

Inventors
Arthur J. Whitcomb
Olaf C. Callow
By Wilkinson, Huxley, Byron & Knight Attys.

Patented Jan. 15, 1935

1,988,100

UNITED STATES PATENT OFFICE 1,988,100

AUTOMATIC WATER CONTROL

Arthur J. Whitcomb and Olaf C. Callow, Chicago, Ill., assignors to Freyn Engineering Company, Chicago, Ill., a corporation of Maine Application May 16, 1932, Serial No. 611,657

9 Claims. (Cl. 266—27)

The invention relates to improvements in skip hoist mechanism employed for delivering materials to a blast furnace and has reference more particularly to novel means for automatically charging water to the furnace at predetermined points in a charging round.

The device of the present invention is associated with skip tubs which through hoisting means are caused to travel from the pit where they are filled to the top of the blast furnace where the materials are discharged. Water may be charged into a blast furnace for a number of reasons such as for reducing the temperature at the top of the furnace, for weighting the fine ore so that it will not be lifted by the blast of the furnace and carried out with the exhaust gases in the form of flue dust or for its effect on the distribution of the material when dropped from the large bell of the furnace. Generally the water is delivered only by those skip loads carrying ore but in some cases it is desirable that water be added along with the coke to prevent the formation of an excess amount of coke dust.

Since accurate regulation of the amount of water charged is necessary as the temperature of the top of the furnace varies, and as it is also required that the water be delivered with particular skip loads it has heretofore been necessary for the skip operator to perform these duties. The value of performing these functions automatically will be appreciated in view of the fact that other devices now used in connection with the charging of the materials to a blast furnace eliminates the other duties of the operator and thus automatic water control will completely do away with the services of a man.

An object of the invention is the provision of means which will operate automatically to deliver to the skip tubs at selected points in a charging round a measured or reasonably constant quantity of water and which will also control the supply of water in accordance with the temperature at the top of the furnace.

A further object is to provide electrical control means for accomplishing automatically the charging of water to the skip tubs and which can be set so as to deliver water to tubs carrying coke or ore as desired.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 2:
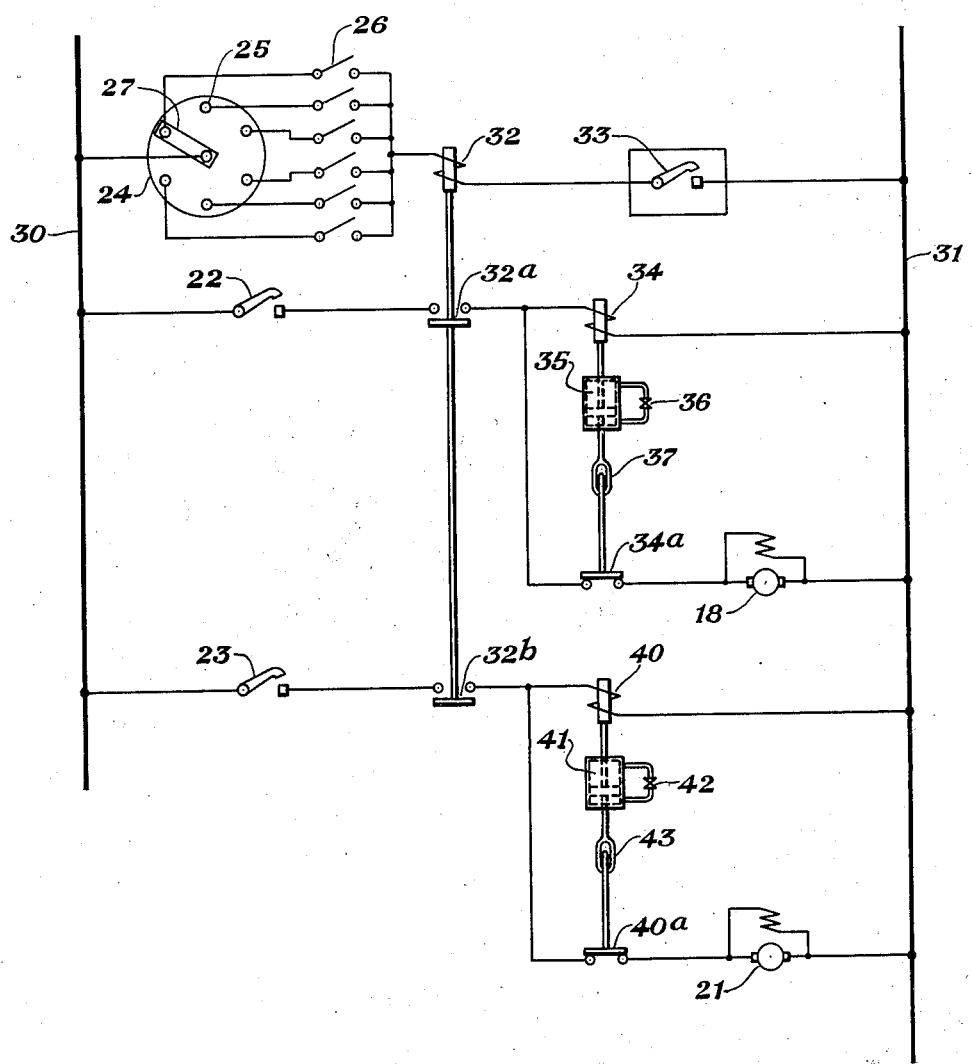

Figure 1 is a diagrammatic view illustrating the association of the skip tubs with the water supply means, and Figure 2 is a diagrammatic illustration of the electrical hook-up for securing automatic operation for discharge of water to the skip tubs.

In skip hoist mechanism of the usual construction a plurality of skip tubs 10 and 12, Figure 1, are adapted to travel on suitable tracks from the pit where they are supplied with materials such as ore and coke to the top of the blast furnace where they deliver their contents. For the reasons stated it is also necessary that certain skip loads be supplied with a quantity of water, and accordingly, suitably positioned above the tubs are water supply pipes 14 and 16, respectively, having connection to a water main of a reasonably uniform head or pressure. Control valve 17 is located in pipe 14 and controls the discharge of water from the pipe, the valve in turn having connection to thrustor 18 which functions upon the closing of the electric circuit to actuate the valve to open, closing of the valve taking place by gravity when the electric circuit is broken. Thrustors are now widely used and well known in the art and it is deemed unnecessary to disclose any of their operating features, it being sufficient to state that the same comprises in effect a motor driven oil pump by which actuation is imparted to the piston and thus the equipment connected therewith. In a like manner pipe 16 is provided with control valve 20 having thrustor 21 connected therewith for actuating the valve as described.

For contact with the skip tubs 10 and 12 are limit switches 22 and 23 constructed with normally open terminals and arranged with respect to the skip tubs whereby the terminals will be closed when a tub is located in the pit. Inasmuch as only one skip tub can be in the pit at the same time, the other being at the top of the furnace discharging material, it follows that it is only possible for one limit switch to be closed at the same time.

The control for the water supply pipes described is shown in Figure 2 and includes a face plate 24 having a plurality of terminals 25 to which is electrically connected an individual selector switch designated 26. Associated with the face plate is an arm 27 which makes connection with each of the terminals 25, the arm being driven by mechanism comprising part of the charging control system so that for each trip of a skip tub the arm is caused to move forward one terminal. The operation of the sequence control is such that the face plate arm indicates each load taken up by the skips during a given charging round. The charging control system which drives this face plate arm is not concerned with the present invention and will not be described in further detail.

The selector switches 26 provide a means for selecting the terminals from which it may be desired to secure action on the part of the water control and as the switch corresponds to a skip load it will be clearly understood that various switches may be closed enabling the operator to select those skip loads which he desires for charging water. Conductors 30 and 31 comprise the power line, being connected to any suitable source of electric power, and are in turn connected with the various apparatus forming the present equipment in the manner to be now described.

The relay 32 has two sets of contacts 32a and 32b which close upon the application of power to the coil of this relay, the same having connection through any one of the selector switches 26 and arm 27 to conductor 30 and through the pyrometer 33 to conductor 31. The pyrometer measures the temperature within the blast furnace in the vicinity of the top and includes electrical contacts which may be adjusted to close at any desired temperature. In operation the pyrometer contacts will close when the temperature reaches a predetermined limit and when the temperature falls below a predetermined limit the contacts will open. The limit switch 22 is connected from line 30 through the contacts 32a of relay 32 through the coil of relay 34 to line 31. Shunted around the coil of relay 34 is a circuit comprising a normally closed set of contacts 34a and the motor of the thrustor 18. Relay 34 is operatively associated through its operating coil with a dash pot 35 having a valve 36 and connected through an elongated link 37 with the normally closed contacts 34a. When the coil of relay 34 is energized it causes the dash pot piston to move upwardly forcing oil from the top side of the piston through the valve 36 to the underside of the piston, and in accordance with the regulation of the valve, the speed of the piston can be controlled. Link 37 is so connected with the contacts 34a that when the piston nears its upper limit of travel it will cause the contacts to open. As a result there will be a certain time delay after relay 34 is energized before the contacts 34a of the relay are opened. The above constitutes only one form of time relay, other types involving motor driven gear mechanisms which must revolve a number of times before contact is made, and various magnetic devices or combinations of a magnetic device and dash pot. These are all well known in the art and may be substituted with equal efficiency for the dash pot structure disclosed.

The limit switch 23 has connection to conductor 30 and through contacts 32b to the coil of relay 40 and thence to the other conductor 31. Shunted around relay 40 is a circuit including the normally closed set of contacts 40a of relay 40 and the motor of thrustor 21. The dash pot 41 and link 43 are associated with relay 40 and the contacts of the same in a manner exactly similar as described with respect to relay 34.

If a charging round comprises one load of ore, another load of ore, a load of stone and several loads of coke delivered to the furnace in the order described it will therefore be understood that the face plate arm 27 will make contact with the first terminal for the first load of ore, the second terminal for the second load of ore, the third terminal for the load of stone and so forth. Should it be desired to charge water only in the two loads of ore those selector switches 26 must be closed corresponding to the loads mentioned, the remaining switches being kept open. As the arm makes contact with the first terminal and subsequently the second terminal, circuits will be completed in sequence through the selector switches to the coil of relay 32 through the contacts of the pyrometer 33 provided the same are closed and thus to the conductor 31.

From the foregoing it will be seen that the coil of relay 32 will be energized only when the arm makes contact with certain terminals and provided the pyrometer indicates that the temperature of the top of the blast furnace is at or above a predetermined point. In other words, the coil of relay 32 is energized for skips containing a certain predetermined kind of material, provided the top temperature is at or above a certain point.

If the above conditions are made and the relay 32 is energized the contacts on the relay will be closed. As soon as skip 10 comes into the pit the limit switch 22 adjacent thereto is closed, completing a circuit from conductor 30 through the limit switch through contacts 32a through relay 34 to conductor 31. Likewise, the circuit is completed around the coil of relay 34 including the normally closed contacts 34a and the motor of thrustor 18. As a result the thrustor operates opening valve 17 discharging water into skip tub 10. Meanwhile relay 34 being energized causes the piston of the dash pot 35 to slowly rise and after a definite interval of time, determined by the setting of valve 36, the piston will approach the top of its stroke at which point the slotted link 37 will cause the normally closed contacts 34a to open, breaking the circuit to the motor. Since the above equipment results in operating the motor of thrustor 18 for a definite interval of time a definite quantity of water is correspondingly charged into the skip tub 10, which quantity can be varied by speeding up or slowing down the operation of the dash pot through valve 36. As an alternative method for permitting the flow of water over a predetermined length of time a small tank having a float control valve can be substituted whereby the quantity of water delivered can be accurately measured.

When the skip tub 10 leaves the pit limit switch 22 will open, breaking the circuit to relay 34, causing the dash pot to reset itself and the contacts 34a to close. While the skip tub is ascending to the top of the furnace the sequence control will cause arm 27 to advance one terminal and since the second selector switch is also closed the circuit will be maintained through relay 32, provided the pyrometer contacts are closed.

Upon the location of skip tub 12 in the pit limit switch 23 will be closed, completing a circuit through the contacts 32b through relay 40 and a second circuit around the relay including contacts 40a and the motor of thrustor 21. The thrustor thus operates, opening valve 20, discharging water to tub 12 and at the end of an elapsed interval, determined by the setting of valve 42 on dash pot 41, contacts 40a will open, breaking the circuit to the motor, allowing the valve to close by gravity. Upon skip tub 12 leaving the pit the limit switch 23 will be opened, breaking the circuit to relay 40, whereupon the same will return to normal position.

As the skip tub travels to the top of the furnace the sequence control will advance the face plate arm to another terminal, and since the third selector switch is open, no circuit will be completed through relay 32 and consequently when skip tub 10 enters the pit no water will be charged on the stone delivered to the tub. Likewise on the two succeeding skip loads containing coke no water will be charged as the selector switches corresponding to these loads are opened. The cycle of operations described is repeated for the next and succeeding charging rounds.

It is to be understood that we do not wish to be limited by the exact embodiment of the device shown, which is merely by way of illustration and not limitation, as various and other forms of the device will of course be apparent to those skilled in the art without departing from the spirit of the invention or the scope of the claims.

We claim:

1. In skip hoist mechanism for charging material to a blast furnace, the combination with skip tubs and water supply means, of electrical means for controlling the discharge of water including mechanism for selecting those skip loads to carry the water, means rendering said means responsive to the temperature at the top of the furnace, and time delay apparatus for regulating the duration of the discharge.

2. In skip hoist mechanism for charging material to a blast furnace, the combination with skip tubs and water supply means, of electrical means for controlling the discharge of water including thermostatic means in the furnace in the vicinity of the top thereof and mechanism for selecting those skip loads to carry the water, said discharge therefore being dependent upon the location of a skip tub in position and upon the temperature at the top of the furnace.

3. In skip hoist mechanism for charging material to a blast furnace, the combination with skip tubs and water supply means, of electrical means for controlling the discharge of water, said means being responsive to the positioning of a skip tub for receiving the water and including selector mechanism adjustable for selecting the desired skip loads to carry the water, and a dash pot valve operating to regulate the duration of the discharge to each load.

4. In skip hoist mechanism for charging material to a blast furnace, the combination with skip tubs and water supply means, of electrical means for controlling the discharge of water, said means including in circuit switches actuated to close upon locating a skip tub in position, and a plurality of selector switches for determining the skip loads to carry the water, said mechanism being operative for selecting any one or all of the skip loads in a charging round.

5. In skip hoist mechanism for charging material to a blast furnace, the combination with skip tubs and water supply means, of electrical means operating automatically to charge a measured quantity of water into said skip tubs when located in position, said means including a control for the water discharge and mechanism for selecting the desired skip loads, and means rendering said means responsive to a predetermined temperature in the furnace.

6. In skip hoist mechanism for charging material to a blast furnace, in combination, a plurality of skip tubs and water supply pipes for the tubs respectively, means for controlling the discharge of water from said pipes, electric means responsive to the position of the skip tubs for energizing the first mentioned means to effect said discharge, said electric means including in circuit thermostatic means located in the furnace whereby said discharge is also controlled by the temperature within the furnace, and timing apparatus including dash-pot mechanism for regulating the duration of the discharge.

7. In skip hoist mechanism for charging material to a blast furnace, in combination, a plurality of skip tubs and water supply pipes for the tubs respectively, motor actuated means for controlling discharge of water from said pipes, switches positioned for actuation by the skip tubs and connected in circuit with the motor actuated means, said switches closing the circuit to energize said motor actuated means to cause discharge of water when the tubs are positioned to receive the same, thermostatic means located in the furnace and connected in the electric circuit to control the discharge according to the temperature within the furnace, and timing apparatus including dash-pot mechanism for regulating the duration of the discharge.

8. In skip hoist mechanism for charging material to a blast furnace, the combination with skip tubs and water supply means, of mechanism for automatically selecting predetermined skip loads to be supplied with water, means for regulating the discharge of said water including a valve normally closed to prevent the escape of fluid therefrom, electrically actuated means having connections constructed and arranged to cause opening of the valve upon energization of said means, and timing mechanism for controlling the time elapsing between energization of said means and closing of the valve.

9. In skip hoist mechanism for charging material to a blast furnace, the combination with skip tubs and water supply means, of mechanism for automatically selecting predetermined skip loads to be supplied with water, means for regulating the discharge of said water including a valve normally closed to prevent the escape of fluid therefrom, electrically actuated means having connections constructed and arranged to cause opening of the valve upon energization of said means, a solenoid operative to break the circuit to said electrically actuated means to allow the valve to close, and dash-pot mechanism for controlling the time elapsing between the energization of the solenoid and the closing of the valve.

ARTHUR J. WHITCOMB.
OLAF C. CALLOW.